(12) United States Patent
Bestfleisch et al.

(10) Patent No.: US 11,048,480 B1
(45) Date of Patent: Jun. 29, 2021

(54) SYNCHRONOUS SIDE-BY-SIDE EXTENSIBILITY

(71) Applicant: SAP SE, Walldorf (DE)

(72) Inventors: Ulrich Bestfleisch, Schwetzingen (DE); Eduard Stelle, Ubstadt-Weiher (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/827,364

(22) Filed: Mar. 23, 2020

(51) Int. Cl.
*G06F 8/30* (2018.01)
*H04L 29/08* (2006.01)
*G06F 9/54* (2006.01)
*G06F 8/65* (2018.01)

(52) U.S. Cl.
CPC .............. *G06F 8/30* (2013.01); *G06F 8/65* (2013.01); *G06F 9/547* (2013.01); *H04L 67/10* (2013.01)

(58) Field of Classification Search
CPC . G06F 8/30; G06F 8/65; G06F 9/4484; G06F 9/44521–44536; G06F 16/252; G06F 9/547–548; H04L 67/10; H04L 67/32; G06Q 30/016
See application file for complete search history.

(56) References Cited

U.S. PATENT DOCUMENTS

| 10,437,828 | B2 * | 10/2019 | Allgaier | G06F 16/24562 |
| 2007/0239985 | A1 * | 10/2007 | Bernabeu-Auban | G06F 21/53 713/168 |
| 2017/0177671 | A1 * | 6/2017 | Allgaier | G06F 16/24562 |
| 2020/0233678 | A1 * | 7/2020 | Seering | G06F 9/44526 |

* cited by examiner

*Primary Examiner* — Todd Aguilera
(74) *Attorney, Agent, or Firm* — Buckley, Maschoff & Talwalkar LLC (57) ABSTRACT

A system and method providing a single entry point for implementing software extensions across multiple different software applications. In one embodiment, the method may include retrieving an indication of an extension point offered by a cloud application, the extension point being defined by a signature including a name and one or more parameters; generating one or more extension point implementations of the extension point by configuring custom code that fulfills the signature of the extension point; and sending, to the cloud application, an indication the extension point is active for requesting an execution of the one or more extension point implementations to be executed apart from the cloud application.

17 Claims, 7 Drawing Sheets

SYNCHRONOUS SIDE-BY-SIDE EXTENSIBILITY

BACKGROUND

Software extensibility provides a mechanism for customers to extend a cloud-based solution with a strict contract between a cloud system being extended and a customer's extensions such that the underlying cloud system can be upgraded without breaking the extensions. Software developed and maintained by developers often evolves over time to achieve changes in specification and implementation. A customer of a group of software applications, whether from a single or multiple vendors, may expect a seamlessly integrated homogenous suite of applications. This expectation also holds true for extensibility capabilities related to multiple different cloud applications.

However, in the context of cloud applications there are challenges in providing consistent extensibility capabilities to the different cloud applications. The multiple cloud applications may run on different technology stacks, the code of the applications is owned by the cloud application vendor(s), the life cycle of the cloud applications is controlled by the cloud applications' developer, and careful consideration must be taken to ensure that any extensions of the cloud applications do not negatively impact the cloud application.

Therefore, there exists a need for an improved mechanism for extensibility in today's multi-tenant cloud computing environment.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 7 is an illustrative block diagram of a computing system, in accordance with an example embodiment Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

Software applications can be extensible in that each application may allow customization to expand features or add new functionalities to the application. In multi-tenant cloud computing contexts in particular, extensibility logic should run completely isolated for each tenant and the lifecycle of extended code and the extended cloud applications should be decoupled from each other to provide the desired extensibility consistency.

In a multi-tenant cloud computing environment, independently developed software applications on different technology stacks are made accessible to a user (customer). The different applications may be developed by different vendors using different programming languages, runtime environments, etc.

However, extending the software applications that require different semantics and tools has typically been performed manually. Such a process requires an expert user to understand the different tools/semantics in order to implement extensions from one software application to another. This process may be time-consuming, as well as prone to errors and requires the user to have knowledge of multiple different programming tools and technologies.

In some aspects, the example embodiments herein are directed to extension use-cases wherein extension code is executed synchronously in the processing chain of an incoming request. The execution of specific, custom logic of the extensions in embodiments herein can influence or otherwise have an impact on the control flow of a cloud application extended thereby. Embodiments herein stand in contrast to systems and methods based on asynchronous, event-based extensions that are triggered by events of a cloud application and run the extension logic asynchronously where the standard, core logic of the cloud application executes as normal, unaffected by the running of the extension. That is, the cloud application extensions disclosed herein do not merely react to a trigger event of a cloud application, but further exert some measure of control over the executing core logic of the cloud application itself.

As a non-limiting example, a software cloud application may be directed to creating a sales opportunity based on a captured lead, where the creation of the opportunity only succeeds (e. g. the opportunity is saved) when certain, custom conditions of a customer are met. Here, data created as specified by the cloud application should not be saved and then evaluated to determine whether the saved opportunity meets the specific criteria of the customer to somehow invalidate the saved opportunity if the conditions are not satisfied. What is needed is a mechanism (e.g., additional executable logic of an extension) to evaluate the created opportunity regarding the specific, custom conditions specified by the customer during the control flow of the cloud application that permits the created opportunity to be saved if the conditions are met, but otherwise prevents the saving of the opportunity. In this case, a mandatory field in the specification of the specific conditions may provide an error (or other) message controlled by the customer should the request to create the opportunity fail to satisfy the specific conditions. In this manner, some embodiments herein provide a method, system, and framework within which an extension can exert influence over the control flow of a standard cloud application logic.

Figure 1:
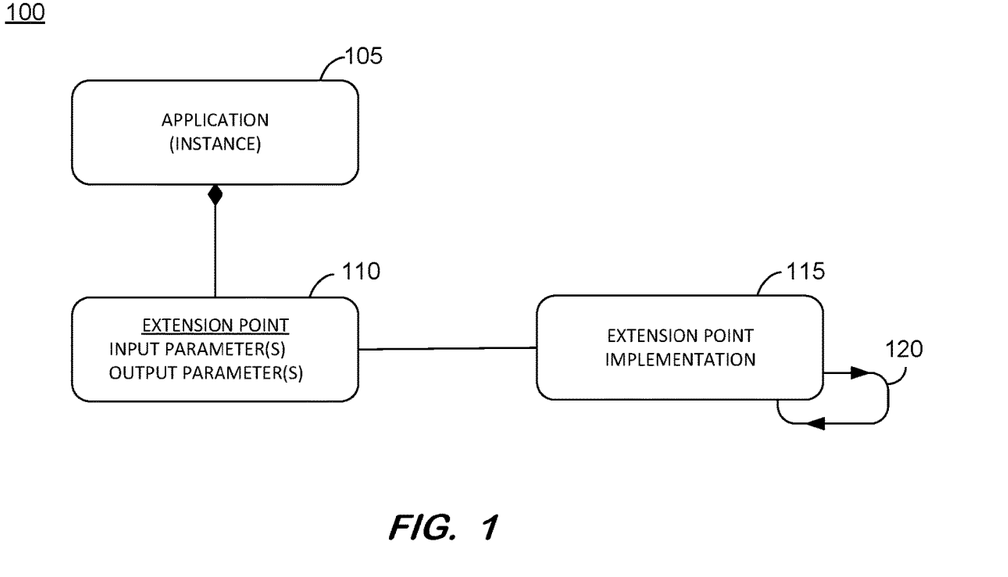
FIG. 1 is a diagram illustrating aspects of an extension point in accordance with an example embodiment.

FIG. 1 illustrates some aspects of a computing architecture 100 that supports an extensibility system in accordance with an example embodiment. Referring to FIG. 1, the architecture 100 includes an instance of an application 105. In the context of a multi-tenant cloud computing environment or context, application instance 105 may be representative of any one of the multiple different tenant applications. Each cloud application, as represented by application 105, offers one or more extension points 110 that may each be leveraged to create one or more extension point implementations 115 that define specific, custom functions and capabilities of a customer. Herein, an extension point is the definition of a named signature of a function that includes input and output parameters that is provided in a cloud application. Extension points have certain semantics in the control of the cloud application. An extension point (e.g., 110) is implemented by customer specified extension functions 115 and is run outside of the application offering the extension point. In some aspects, multiple customer extension functions 115 might implement an extension point. In such cases, the extension point implementations 115 are executed in a predefined sequence or order, as indicated at 120.

Figure 2:
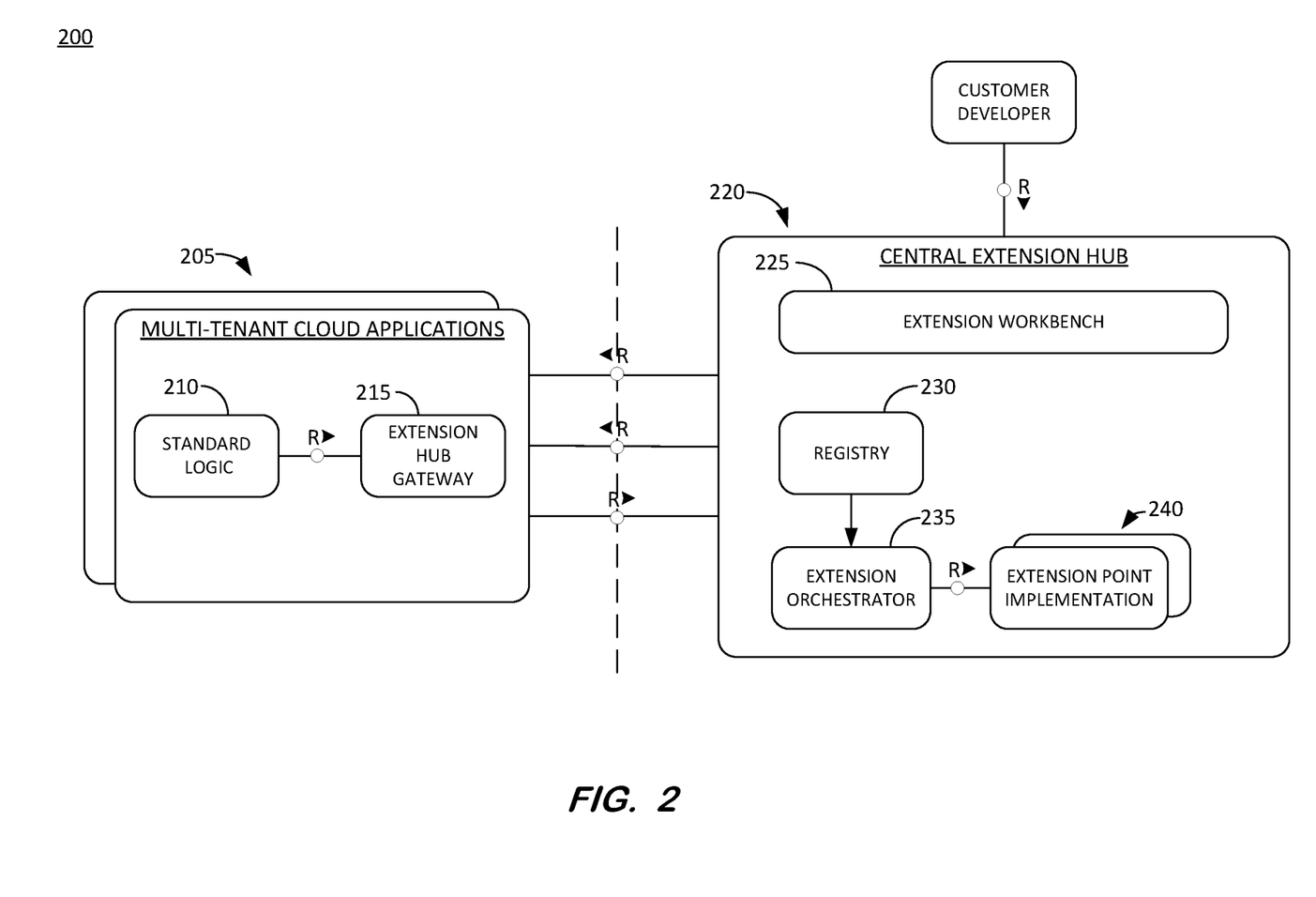
FIG. 2 is an illustrative diagram of a system architecture that supports synchronous extensibility, in accordance with an example embodiment.

FIG. 2 is an illustrative example of an overall system architecture 200 that supports an extensibility system including the aspects disclosed in FIG. 1, in accordance with some embodiments herein. System 200 includes multiple cloud applications configured in a multi-tenant system 205. Each of the cloud applications in the multi-tenant configuration include standard core logic 210 for implementing the functionalities developed and maintained by a developer of the cloud application, including updated thereto. Additionally, each cloud application includes an extension hub gateway 215. Extension hub gateway 215 is an interface component that handles all communication to entities external to the application. The multi-tenant cloud applications are connected to a central extension hub 220. Extension hub 220 serves as a single entry point for extension developers (e.g., customers, partners, etc.) to perform all extensibility tasks, including the creation of extensions including specific, custom logic using extension workbench 225. Herein, each cloud application 205 in a customer's landscape publishes its extension point metadata to registry 230 of the extension hub 220. In the extension hub, extension developers may select an extension point from the available extension points in the registry to implement a set of custom logic to extend their desired functionality and control to the standard logic of the application offering the extension point. A customer implements an extension point by leveraging the signature that is defined by the extension point. The customer creates an extension point implementation that fulfills the signature defined by the extension point, wherein the extension point implementation may specify values for the input and output parameters specified in the signature of the extension point. Once created, the customer can activate the extension point implementation 240 so that it is available at runtime for use by a cloud application. Extension point implementations 240 are persisted in a database and may be called cloud applications 205. After activation, cloud applications 205 may call the extension point implementations 240 on central extension hub 220 during an execution of standard logic 210 at runtime. An extension orchestrator 235 receives and handles calls for extension point implementations from extension hub gateway of the cloud application. An extension point may have multiple extension point implementations 240 associated therewith. Extension orchestrator 235 ensures the extension implementations are executed in the defined order or sequence specified during the creation of the extension point implementations for a particular extension point. The control logic 210 of the application waits for a return result from extension hub before continuing its control flow processing.

In some embodiments, one call in the control flow of a cloud application for an extension point of an application is used to call or request all of the multiple extension point implementations associated with a given application extension point. An extension orchestrator (e.g., FIG. 2, 235) may handle the requesting of and order of execution for all of the multiple extension implementations for the called extension point.

In some aspects, communication between the multi-tenant system including cloud applications 205 and a remote central extension hub herein is supported by remote calls therebetween. Given that remote communications may, at times, be unstable and/or fail, some embodiments herein may incorporate one or more considerations to support and facilitate successful operation without undesired consequences in such environments. In some embodiments, a system and method herein may repeatedly have an extension hub gateway attempt to communicate a request or call the extension hub in the event the extension hub is not reachable in a first communication attempt. In some embodiments, multiple (retried) calls for extension point implementations do not cause problems or inconsistencies on the extension point implementations. That is, the extension point implementations are idempotent functions. Moreover, in some embodiments for each extension point, there may only be one call from a cloud application and the extension hub (e.g., extension orchestrator) will orchestrate and chain the multiple extension point implementations for the extension point. In this manner, there is no call per extension point implementation and communication calls might be restrained to a minimum between the cloud applications and the extension hub herein.

Figure 3:
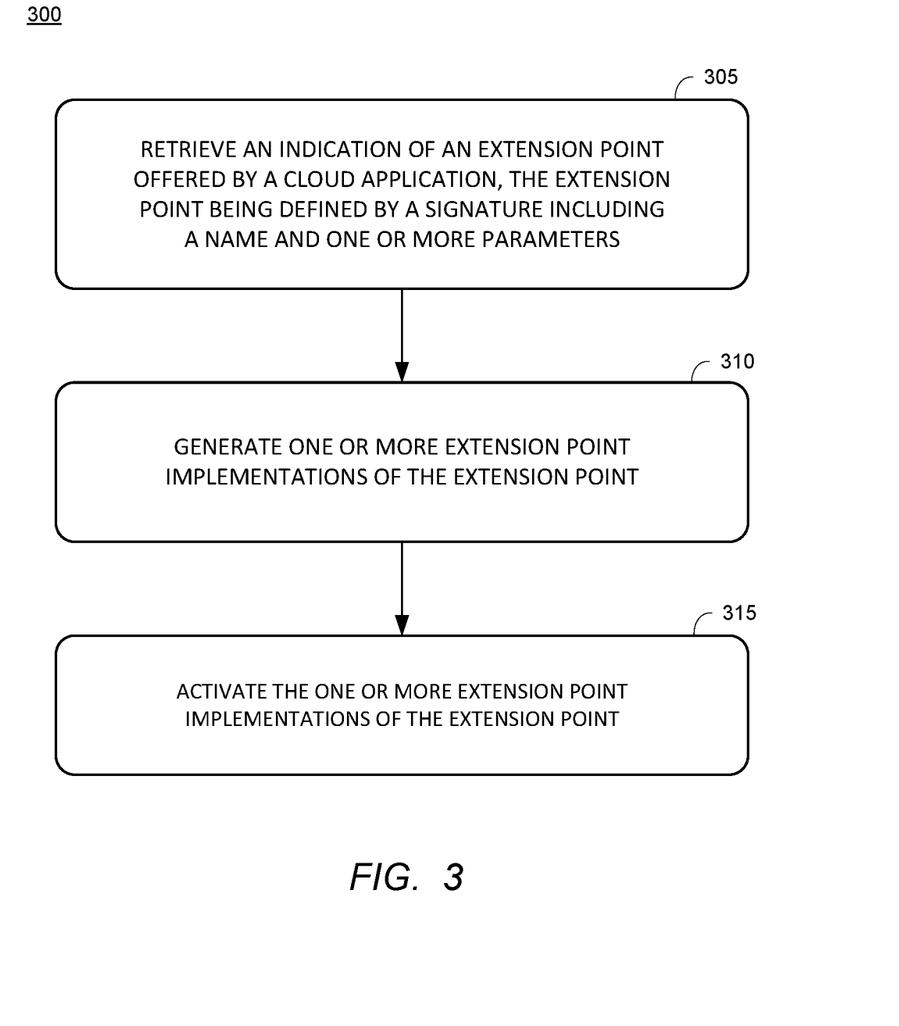
FIG. 3 is an illustrative flow diagram of a process for configuring extension point implementations, in accordance with an example embodiment.

FIG. 3 is an illustrative depiction of a flow diagram 300 related to an extension point configuration process, in accordance with some embodiments herein. In some aspects, a cloud application publishes metadata representative of an extension point offered by the application. At operation 305, an indication of the extension point offered by the cloud application is retrieved by an extension hub. The indication of the offered extension point (e.g., a list) may be saved in a registry of the extension hub and later referenced by a customer or partner in the development of extension point implementations. As noted above, an extension point is defined by a named signature that specifies input and output parameters defining the end point.

At operation 310, a customer recognizing an extension point is offered by a particular cloud application based on the reception of the indicator at operation 305, may proceed to generate one or more extension point implementations by configuring custom code in accordance with the signature definition of the extension point. The signature may provide a temple or model for configuring the extension point implementation. In some embodiments, an extension workbench provided by a central extension hub herein may include tools for an extension developer of a customer or partner to specify custom, specific executable code to provide new or additional functionality and capabilities to the control flow of a cloud application via an extension point implementation.

At operation 315, the customer or partner extension developer may send an indication (e.g., request) to the cloud application that the extension point implementation is active for execution. It is noted that the extension point implementation is to be executed apart from (i.e., outside of) the execution of the cloud application offering the extension point.

Figure 4:
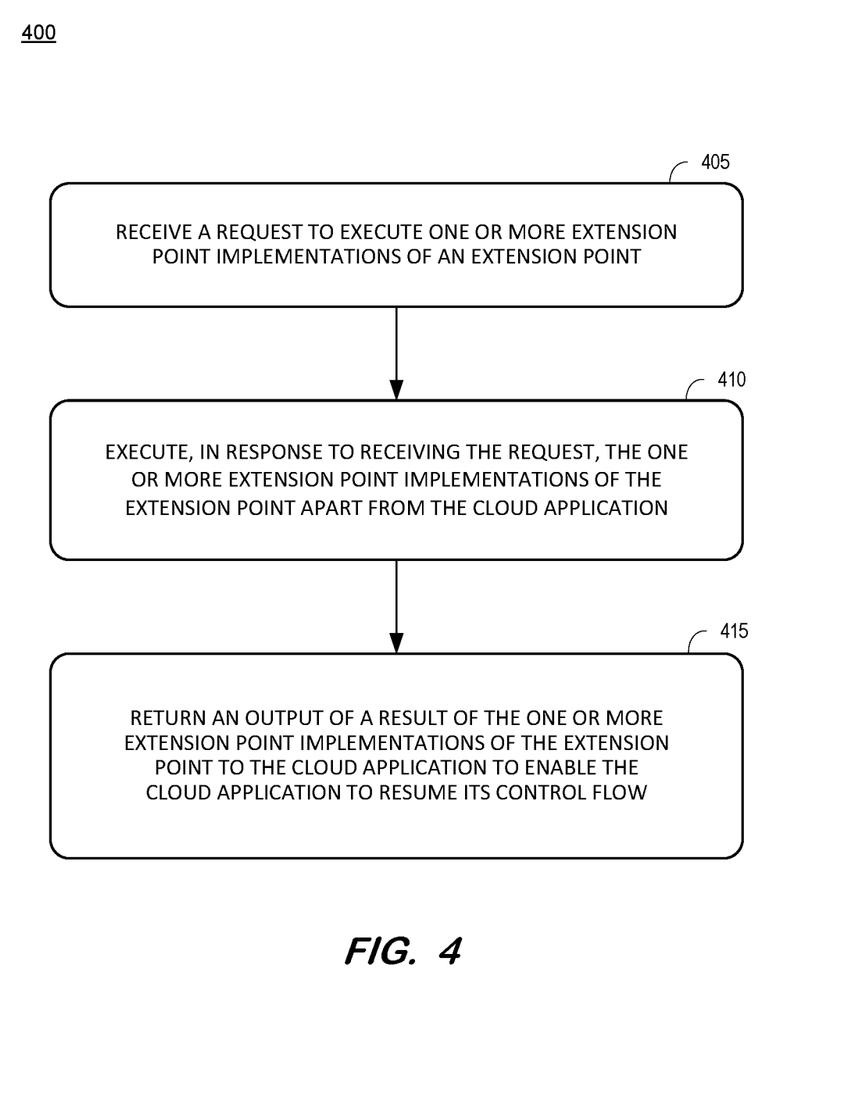
FIG. 4 is an illustrative flow diagram of a process for using extension point implementations, in accordance with an example embodiment.

FIG. 4 is an illustrative depiction of a flow diagram 400 related to a process to use activated extension points, in accordance with an example embodiment. A cloud application will be aware of the active extension points of an extension hub, having been informed of such by a call, request, or other communication from the extension hub. In some embodiments, the extension hub gateway of the cloud application may be aware of the active extension points based on a metadata representation at the extension gateway from the extension hub. At runtime during an execution of the standard logic of the cloud application, a call to an active extension point is encountered in the control flow of the application. In response thereto, the extension hub gateway of the cloud application makes a call or request to the extension hub, which is received by the extension hub at operation 405, and relinquishes control of the logic flow of the cloud application to the extension hub. At operation 410, the extension orchestrator of the extension hub may then direct the execution of all of the extension point implementations for the called extension point in reply to the single call to the extension hub.

At operation 415, upon completion of the execution of the extension point implementations for the called extension point, an output (e.g., parameter value, message, etc.) is returned to the cloud application via the extension hub gateway of the cloud application to cede control of the logic flow back to the cloud application. The control flow of the cloud application may be altered or otherwise influenced by the execution of the extension point implementations. For example, one or more tasks that might normally be performed per the standard logic of the cloud application (e.g., save an instance of a data structure, execute certain other code, etc.) might be delayed or abandoned based on a result of the extension point implementations and/or additional tasks or actions may be performed in response to the result of the extension point implementations (e.g., present a certain message to a user, trigger the execution of another extension point, etc.).

Figure 5:
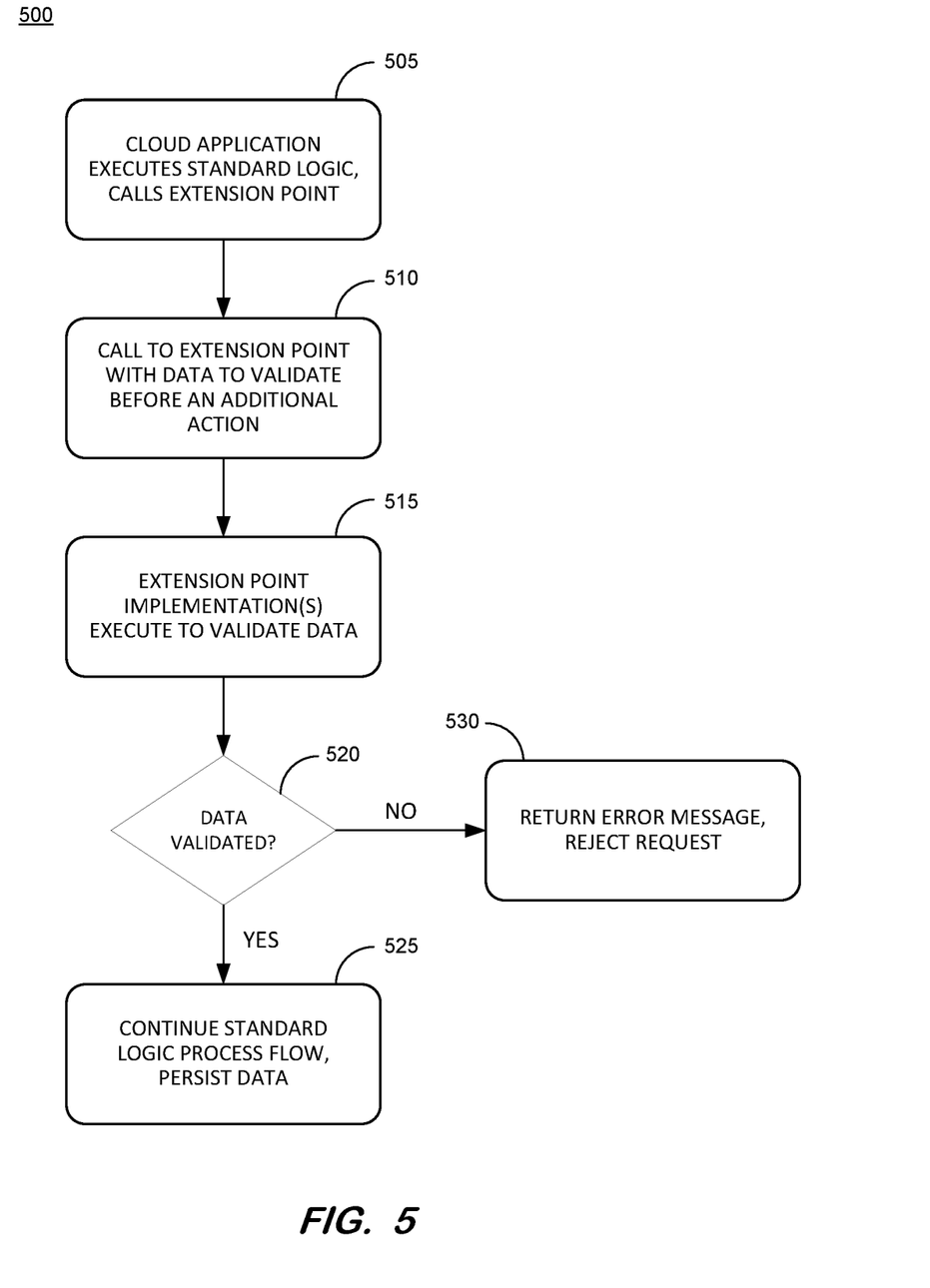
FIG. 5 is a flow diagram of a process for an illustrative use-case, in accordance with an example embodiment.

FIG. 5 is a flow diagram of a process 500 for an illustrative use-case, in accordance with an example embodiment. Process 500 demonstrates a tangible use-case for leveraging the synchronous extensibility features disclosed herein. In the example of FIG. 5, an extension point might be offered to provide validation logic for a cloud application. In this example, a customer might determine whether, for example, a sales lead, opportunity, or other entity created in a control flow logic is validated before it is persisted. At operation 505, the cloud application (e.g., a sales force automation cloud application) executes its standard logic and calls an extension point during the normal execution flow thereof. At operation 510, a call or request to the extension point with data to validate is provided to the extension hub of a customer. In some aspects, the extension point is defined by a named method signature including input and output parameters for the extension point. In the present example, the signature will include the opportunity data as an input and an expected result is a return list of validation messages. In one embodiment, the signature may be represented, in pseudo-code, as:

function validateOpportunity(opp: OpportunityData): List<ValidationMessage>.

At operation 515, extension implementations configured by a customer or partner extension developer for the extension point are executed to validate the data included in the request. The data is validated at operation 520 in accordance with the specific conditions specified by the customer's custom logic that also fulfills the extension point signature (i.e., definition). In the instance the data is validated, a message is returned (or the lack of an error message) that indicates the request to validate the data is successful, the standard logic of the cloud application resumes, and the data is persisted by the cloud application (e.g., in a database) at operation 525. In the event the data is not validated at operation 520, then an error (or other appropriate) message is returned to the cloud application via the extension hub gateway thereof, thereby rejecting the request to validate the data at operation 530. In this example, the non-validated data may not be persisted by the cloud application.

As an example, pseudo-code for the standard logic of a cloud application of the present example might resemble the following.

```
. . .
List<ValidationMessages>
    messages=extensionGateway.validateOpportunity
    (opp);
if (messages.containErrors( )) {
    reject(messages)
} else {
    persist(opp)
}
. . .
```

In another example use-case, an extension developer might want to have a management sponsor added to a sales opportunity over a threshold value since these types of opportunities may be particularly valuable to a business. Example pseudo-code for custom logic to implement an extension point in this example is provided below.

```
function myOpportunityValidation(opp) {
    . . .
    if (opp.value>=100000 && opp.sponsor is null) {
        messages.add("Error", "Management sponsor needs
            to be entered");
    }
    return messages;
}
```

The foregoing examples are illustrative of some of the use-cases the features and aspects disclosed herein might be applied to and are neither exhaustive of the applications nor limiting to the scope of the present disclosure.

Figure 6:
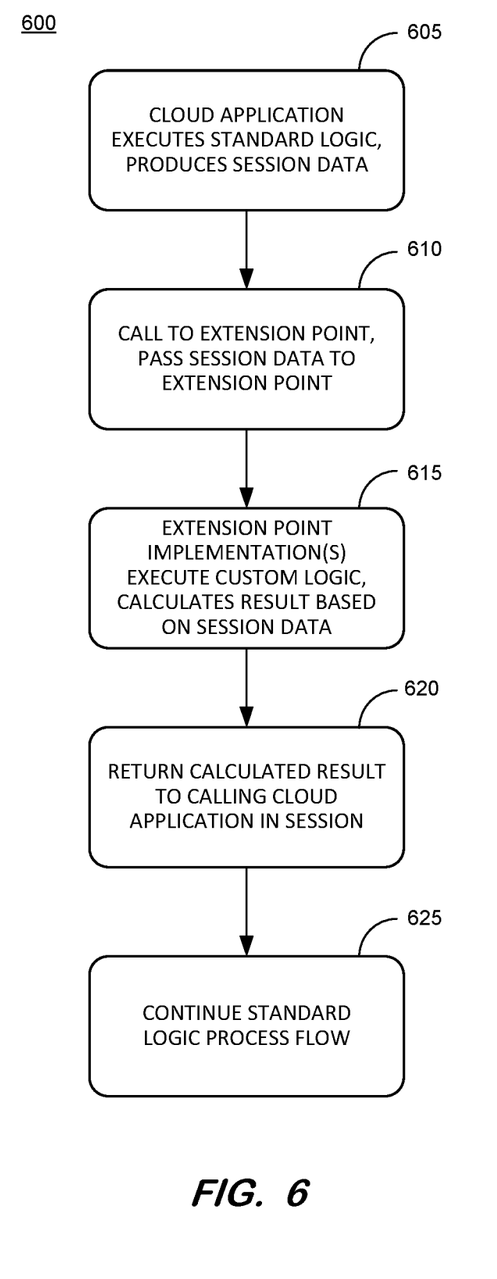
FIG. 6 is a flow diagram of a process for another illustrative use-case, in accordance with an example embodiment.

FIG. 6 is a flow diagram of a process 600 for another illustrative use-case, in accordance with an example embodiment. In the example of FIG. 6, an extension point might be offered to a have session data generated by an application further processed to change, alter, or update the data for the cloud application. In this example, a customer might calculate a value based on a data value provided by the cloud application in a control flow logic before further tasks are performed by the cloud application. At operation 605, the cloud application executes its standard logic and calls an extension point during the normal execution flow thereof. At operation 610, a call or request to the extension point and data from the cloud application is passed to the extension hub of a customer.

At operation 615, extension point implementations configured by a customer or partner extension developer for the extension point are executed to calculate a result based on the cloud application's session data included with the extension point signature in the request. The session data is processed in accordance with the specific conditions specified by the customer's custom logic that also fulfills the extension point signature. The result of the calculation is returned to the calling cloud application at operation 620 and control of the standard logic of the cloud application is resumed by the cloud application at operation 625.

Figure 7:
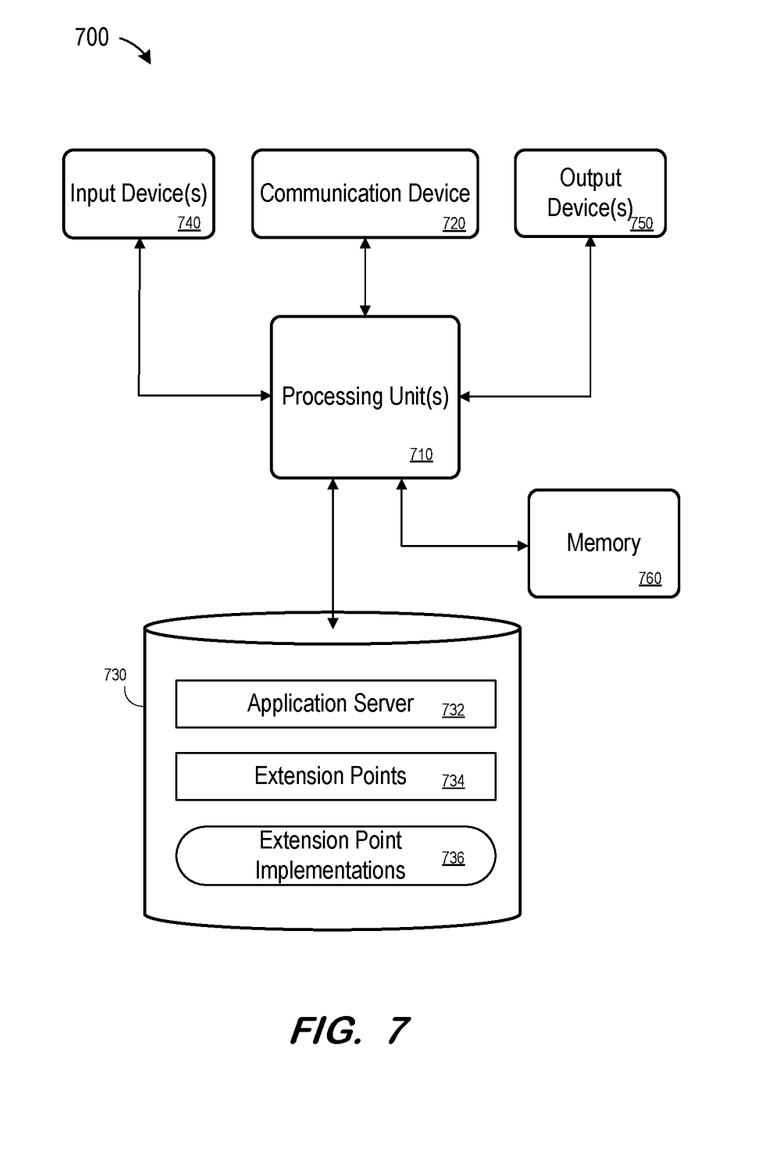

FIG. 7 illustrates a computing system 700 that may be used in any of the methods and processes described herein, in accordance with an example embodiment. FIG. 7 is a block diagram of server node 700 embodying a central extension hub, according to some embodiments. Server node 700 may comprise a general-purpose computing apparatus and may execute program code to perform any of the functions described herein. Server node 700 may comprise an implementation of central extension hub 220 in FIG. 2 in some embodiments. Server node 700 may include other unshown elements according to some embodiments.

Server node 700 includes processing unit(s) 710 operatively coupled to communication device 720, data storage device 730, one or more input devices 740, one or more output devices 750, and memory 760. Communication device 720 may facilitate communication with external devices, such as an external network or a data storage device. Input device(s) 740 may comprise, for example, a keyboard, a keypad, a mouse or other pointing device, a microphone, knob or a switch, an infra-red (IR) port, a docking station, and/or a touch screen. Input device(s) 740 may be used, for example, to enter information into apparatus 700. Output device(s) 750 may comprise, for example, a display (e.g., a display screen) a speaker, and/or a printer.

Data storage device 730 may comprise any appropriate persistent storage device, including combinations of magnetic storage devices (e.g., magnetic tape, hard disk drives and flash memory), optical storage devices, Read Only Memory (ROM) devices, etc., while memory 760 may comprise Random Access Memory (RAM).

Application server 732 may each comprise program code executed by processor(s) 710 to cause server 700 to perform any one or more of the processes described herein. Such processes may include generation and configuration of one or more extension point implements 736 corresponding to one or more of extension points 734. Embodiments are not limited to execution of these processes by a single computing device. Data storage device 730 may also store data and other program code for providing additional functionality and/or which are necessary for operation of server 700, such as device drivers, operating system files, etc.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computer-implemented method, the method comprising:

retrieving, by an extension hub including a registry to store indications of active extension point implementations from a cloud application, an extension orchestrator to manage execution of extension point implementations, and access to one or more extension point implementations, an indication of an extension point offered by the cloud application, the extension hub being separate and distinct from the cloud application and the extension point being defined by a signature including a name and one or more parameters of the extension point;

generating, in response to the retrieved indication for the offered extension point of the cloud application, one or more extension point implementations of the extension point by configuring custom code that fulfills the signature of the extension point; and sending, to the cloud application from the extension hub, an indication the extension point is active for requesting an execution of the one or more extension point implementations to be executed apart from the cloud application, an active extension point having at least one extension point implementation generated for the extension point and accessible to the extension hub.

2. The method of claim 1, wherein the retrieved indication of the extension point offered by the cloud application is represented by metadata published by the cloud application and persisted in the registry of the extension hub.

3. The method of claim 1, further comprising:
receiving, at a runtime in response to a call to the extension point during an execution of the cloud application, a request by the extension hub to execute the one or more extension implementations of the extension point;
executing, in response to receiving the request, the one or more extension implementations of the extension point by the extension hub apart from the cloud application; and
returning, by the extension hub, an output of the execution of the one or more extension implementations of the extension point to the cloud application to enable the cloud application to resume the execution of the cloud application.

4. The method of claim 3, wherein the one or more extension point implementations of the extension point are managed by the extension orchestrator of the extension hub to be executed in a predefined order.

5. The method of claim 3, wherein the request received by the extension hub to execute the one or more extension implementations of the extension point is invoked by a single call to the extension hub including the request.

6. The method of claim 3, further comprising:
receiving, by the extension hub in the request, data passed to the extension point by the cloud application;
changing, by the executing of the one or more extension implementations of the extension point, the received data; and
returning, by the extension hub with the output, the changed data to the cloud application.

7. A system comprising:
a memory storing processor-executable program code; and
a processor to execute the processor-executable program code in order to cause the system to:
retrieve, by an extension hub including a registry to store indications of active extension point implementations from a cloud application, an extension orchestrator to manage execution of extension point implementations, and access to one or more extension point implementations, an indication of an extension point offered by the cloud application, the extension hub being separate and distinct from the cloud application and the extension point being defined by a signature including a name and one or more parameters of the extension point;
generate, in response to the retrieved indication for the offered extension point of the cloud application, one or more extension point implementations of the extension point by configuring custom code that fulfills the signature of the extension point; and
send, to the cloud application from the extension hub, an indication the extension point is active for requesting an execution of the one or more extension point implementations to be executed apart from the cloud application, an active extension point having at least one extension point implementation generated for the extension point and accessible to the extension hub.

8. The system of claim 7, wherein the retrieved indication of the extension point offered by the cloud application is represented by metadata published by the cloud application and persisted in the registry of the extension hub.

9. The system of claim 7, the processor further configured to execute the processor-executable program code in order to cause the system to:
receive, at a runtime in response to a call to the extension point during an execution of the cloud application, a request by the extension hub to execute the one or more extension implementations of the extension point;
execute, in response to receiving the request, the one or more extension implementations of the extension point by the extension hub apart from the cloud application; and
return, by the extension hub, an output of the execution of the one or more extension implementations of the extension point to the cloud application to enable the cloud application to resume the execution of the cloud application.

10. The system of claim 9, wherein the one or more extension point implementations of the extension point are managed by the extension orchestrator of the extension hub to be executed in a predefined order.

11. The system of claim 9, wherein the request received by the extension hub to execute the one or more extension implementations of the extension point is invoked by a single call to the extension hub including the request.

12. The system of claim 9, the processor further configured to execute the processor-executable program code in order to cause the system to:
receive, by the extension hub in the request, data passed to the extension point by the cloud application;
change, by the executing of the one or more extension implementations of the extension point, the received data; and
return, by the extension hub with the output, the changed data to the cloud application.

13. A non-transitory, computer readable medium storing instructions, which when executed by at least one processor cause a computer to perform a method comprising:
retrieving, by an extension hub including a registry to store indications of active extension point implementations from a cloud application, an extension orchestrator to manage execution of extension point implementations, and access to one or more extension point implementations, an indication of an extension point offered by the cloud application, the extension hub being separate and distinct from the cloud application and the extension point being defined by a signature including a name and one or more parameters of the extension point;
generating, in response to the retrieved indication for the offered extension point of the cloud application, one or more extension point implementations of the extension point by configuring custom code that fulfills the signature of the extension point; and
sending, to the cloud application from the extension hub, an indication the extension point is active for requesting an execution of the one or more extension point implementations to be executed apart from the cloud application, an active extension point having at least one extension point implementation generated for the extension point and accessible to the extension hub.

14. The medium of claim 13, wherein the retrieved indication of the extension point offered by the cloud application is represented by metadata published by the cloud application and persisted in the registry of the extension hub.

15. The medium of claim 13, further comprising:
receiving, at a runtime in response to a call to the extension point during an execution of the cloud application, a request by the extension hub to execute the one or more extension implementations of the extension point;

executing, in response to receiving the request, the one or more extension implementations of the extension point by the extension hub apart from the cloud application; and returning, by the extension hub, an output of the execution of the one or more extension implementations of the extension point to the cloud application to enable the cloud application to resume the execution of the cloud application.

16. The medium of claim 15, wherein the one or more extension point implementations of the extension point are managed by the extension orchestrator of the extension hub to be executed in a predefined order.

17. The medium of claim 15, further comprising:

receiving, by the extension hub in the request, data passed to the extension point by the cloud application;

changing, by the executing of the one or more extension implementations of the extension point, the received data; and returning, by the extension hub with the output, the changed data to the cloud application.

* * * * *